(12) United States Patent
Park et al.

(10) Patent No.: US 9,076,303 B1
(45) Date of Patent: Jul. 7, 2015

(54) IMPLEMENTING CONTESTS IN SOCIAL NETWORKS

(75) Inventors: Joseph C. Park, Redmond, WA (US); Kian Fai Leong, Singapore (SG); Woo Jin Kim, Boston, MA (US); David A. Inman, Austin, TX (US); Hsueh-Li Lu, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2426 days.

(21) Appl. No.: 11/835,844

(22) Filed: Aug. 8, 2007

(51) Int. Cl.
*G07F 17/32* (2006.01)

(52) U.S. Cl.
CPC .................................. *G07F 17/3274* (2013.01)

(58) Field of Classification Search
CPC ................................................... G07F 17/3274
See application file for complete search history.

(56) References Cited

U.S. PATENT DOCUMENTS

| | | | | |
|---|---|---|---|---|
| 7,234,117 B2 * | 6/2007 | Zaner et al. | | 715/758 |
| 7,240,093 B1 * | 7/2007 | Danieli et al. | | 709/205 |
| 7,503,006 B2 * | 3/2009 | Danieli | | 715/751 |
| 7,828,661 B1 * | 11/2010 | Fish et al. | | 463/42 |
| 2001/0044339 A1 * | 11/2001 | Cordero et al. | | 463/42 |
| 2003/0190960 A1 * | 10/2003 | Jokipii et al. | | 463/42 |
| 2004/0224772 A1 * | 11/2004 | Canessa et al. | | 463/42 |
| 2004/0259641 A1 * | 12/2004 | Ho | | 463/42 |
| 2008/0176655 A1 * | 7/2008 | James et al. | | 463/42 |
| 2009/0024933 A1 * | 1/2009 | Smedley et al. | | 715/753 |
| 2009/0170614 A1 * | 7/2009 | Herrmann et al. | | 463/43 |
| 2009/0291748 A1 * | 11/2009 | Caswell et al. | | 463/25 |
| 2010/0099471 A1 * | 4/2010 | Feeney et al. | | 463/1 |
| 2010/0105462 A1 * | 4/2010 | Walker et al. | | 463/17 |
| 2010/0216553 A1 * | 8/2010 | Chudley et al. | | 463/42 |

* cited by examiner

*Primary Examiner* — Seng H Lim
(74) *Attorney, Agent, or Firm* — Thomas | Horstemeyer, LLP

(57) ABSTRACT

Various systems, methods, and programs embodied in computer-readable mediums are provided for implementing a contest between various social networks. A contest is staged between at least two teams using a server accessible by a plurality of clients. The contest requires each of the teams to achieve a predefined goal. The membership to each one of the teams is restricted to a plurality of individuals associated with a respective one of a plurality of social networks accessible by the server.

79 Claims, 12 Drawing Sheets

```
┌─────────────────────────────────────────────────────────────┐
│     ┌──────────────┬──────────────┬──────────────┐          │
│     │ Browse Games │ Create Game  │  Your Game   │          │
│     └──────────────┴──────────────┴──────────────┘          │
│   Game Settings                                              │
│   ─────────────────────────────────────────────────────────  │
│                                                              │
│   Team Name: [                              ] (Max. 100 characters)
│                                              ╲─353          │
│   Maximum Number of Players per Team: [       ] (Max. 30)   │
│                                              ╲─356          │
│   Time Between Turns:  [          ▽]                         │
│                                   ╲359                       │
│   Length of Game:      [          ▽]                         │
│                                   ╲363                       │
│   Entrance Fee to Play: [          ]                         │
│                                   ╲366                       │
│                                                              │
│   Who to Challenge                                           │
│   ─────────────────────────────────────────────────────────  │
│                        ╱─373                                 │
│   Challenge:  ○ Friend       ● Social Network                │
│                                                              │
│            Your Network           Challenger Network         │
│          [Standford    ▽]  vs.  [Berkeley    ]  [ Search ]   │
│                 ╲376                    ╲379                 │
│                                                              │
│                                                   ╱─383      │
│                                              [ Submit ]      │
│                                                              │
└─────────────────────────────────────────────────────────────┘
                                          ╲─161c
```

FIG. 5

```
┌────────────────────────────────────────────┐
│   You have accepted the challenge from Team Book
│ Worms of Stanford on behalf of Harvard. Please enter
│   a team name for the Harvard below and hit submit.
│         ╱─183                              │
│   [Book Writers               ]            │
│                    ╱─386                   │
│              [ Submit ]                    │
└────────────────────────────────────────────┘
                              ╲─161d
```

FIG. 6

Joe Smith

CONSUMMABLES

| ITEM | COST (Virtual Currency) | COST (US Currency) |
|---|---|---|
| Banana ←403 (-1 Traction) | 30 Coins [Buy] | $0.25 [Buy] |
| Oil ←403 (-3 Traction) | 90 Coins [Buy] | $0.75 [Buy] |
| Vacuum ←403 (Can repel -2 worth of traction attacks) | 60 Coins [Buy] | $0.50 [Buy] |
| Umbrella ←403 (Can repel -3 worth of traction attacks) | 90 Coins [Buy] | $0.75 [Buy] |

DURABLE

| ITEM | COST (Virtual Currency) | COST (US Currency) |
|---|---|---|
| Sandals ←406 (Adds +5 to base traction) | 150 Coins [Buy] | $1.25 [Buy] |
| Shoes ←406 (Adds +10 to base traction) | 300 Coins [Buy] | $2.50 [Buy] |
| Cleats ←406 (Adds +15 to base traction) | 450 Coins [Buy] | $3.75 [Buy] |

Inventory —206

| | |
|---|---|
| Banana | 3 |
| Oil | 1 |
| Vacuum | 0 |
| Umbrella | 1 |

Stats

| | |
|---|---|
| Base Traction | 0 |
| Virtual Coins | 980 |
| Games Won | 0 |
| Games Deserted | 1 |
| Games Lost | 1 |

IMPLEMENTING CONTESTS IN SOCIAL NETWORKS

BACKGROUND

The Internet has provided a new venue for social interaction. Individuals can send email to each other, participate in chat rooms, and engage in other activities. Also, it is easier to find individuals who have a common background or interest, or that are members of various organizations together given the connectivity offered by the Internet.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3-5 are drawings that show examples of network page inserts generated by the contest server of FIG. 1 that may be inserted in network pages generated by the social networking server of FIG. 1 according to various embodiments of the present invention;

FIG. 6 is a drawing of a user interface that is generated by the contest server of FIG. 1 that is presented to a user of the client as part of the network pages generated by the social networking server of FIG. 1 according to an embodiment of the present invention;

FIG. 7 is a drawing of yet another example of a network page insert generated by the contest server of FIG. 1 that may be inserted in a network page generated by the social networking server of FIG. 1 according to an embodiment of the present invention;

DETAILED DESCRIPTION

Figure 1:
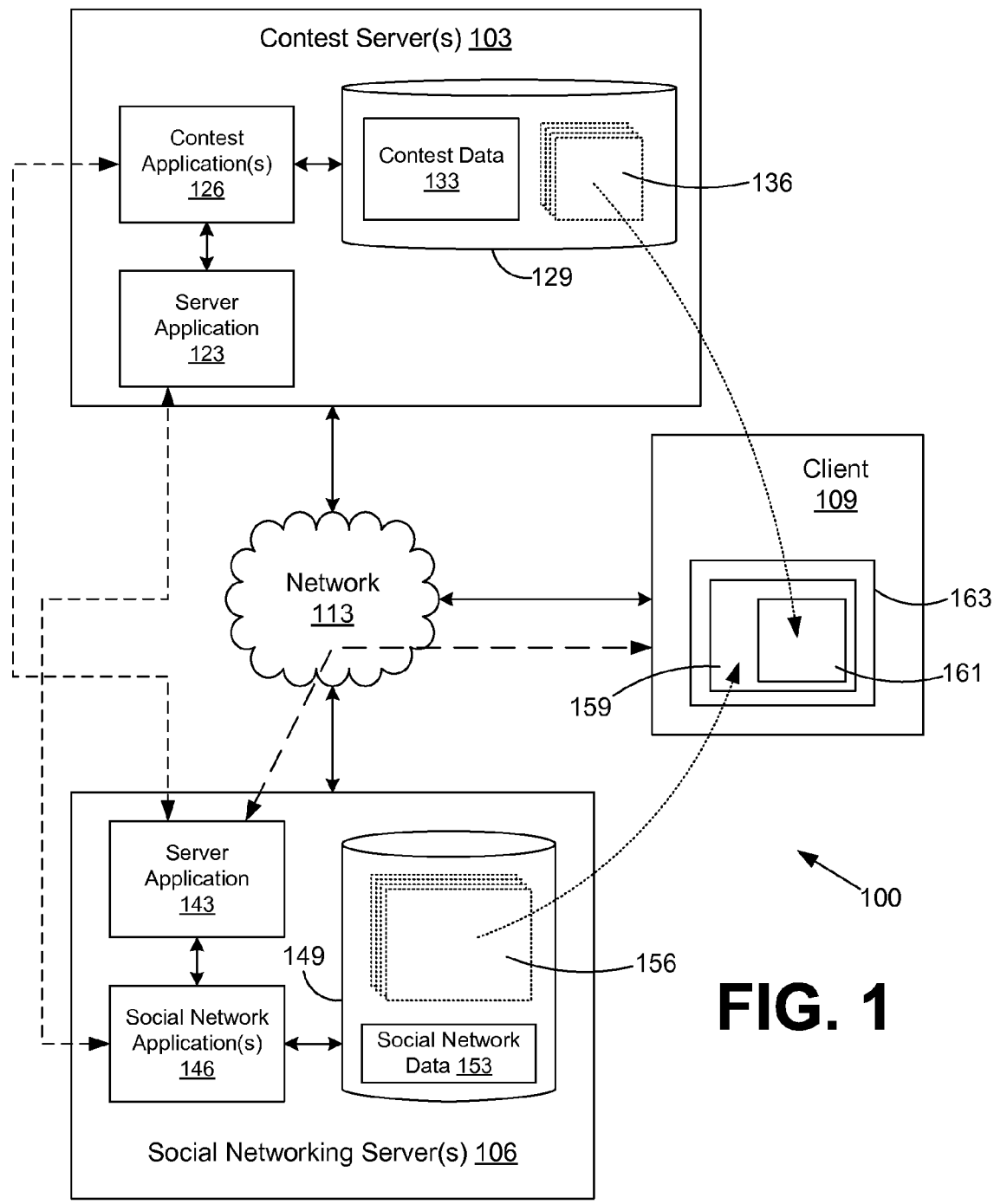
FIG. 1 is a block diagram of a networked environment that employs a contest server, a social networking server, and at least one client according to an embodiment of the present invention.

With reference to FIG. 1, shown is a networked environment 100 according to an embodiment of the present invention. The networked environment 100 includes a contest server 103, a social networking server 106, and a client 109. The contest server 103, social networking server 106, and client 109 each represent a plurality of servers/clients that may exist in the networked environment 100. The contest servers 103, social networking servers 106, and the client 109 are each coupled to an appropriate network 113. The network 113 includes, for example, the Internet, intranets, wide area networks (WANs), local area networks, wireless networks, or other suitable networks, etc., or any combination of two or more such networks. The various components in the networked environment 100 are employed to facilitate the staging of contests among social networks existing in the social networking server 106 as will be described.

The contest server 103 includes various components that are executed in order to stage the contest between members of various social networks. To this end, the contest server 103 includes, for example, one or more server applications 123, contest applications 126, and a data store 129. The server application 123 may be, for example, a web server or other type of server application that fields requests from other devices in the networked environment 100 and interfaces with the contest applications 126 in order to provide the requested information. According to one embodiment, the server application 123 generates web pages or other network pages as can be appreciated.

The content provided by the server applications 123 may be, for example, static or dynamic content. In one embodiment, the content is dynamic in that the network page inserts or full network pages served up by the server application 123 are generated dynamically by the contest applications 126 in response to a given request. To this end, stored in the data store 129 are contest data 133 and network page templates 136.

The contest applications 126 are configured to employ the network page templates 136, contest data 133, and other information to dynamically generate network page inserts that are provided to the social networking server 106. The network page inserts facilitate the staging of contests as will be described. The server applications 123 and the contest applications 126 may be implemented using any one of a number of programming languages such as, for example, C, C++, JAVA, Perl, Python, Flash, or other programming languages. According to one embodiment, the social networking server 106 inserts the network page inserts into respective network pages that are served up to the client 109 as will be described.

The social networking server 106 also provides an illustration of the various types of social networking servers that may be employed to generate various social networking sites in the networked environment 100 according to an embodiment of the present invention. Examples of social networking sites include MYSPACE™, FACEBOOK™, and others. In one example, the social networking servers 106 include server applications 143, social networking applications 146, and a data store 149. The server applications 143 are configured to respond to requests from clients 109 for various network pages associated with the social networking site that is implemented on the social networking server 106. To this end, the server application 143 may comprise, for example, a web server that provides browser access to the various social network applications 146 in the social networking server 106 to a client 109 as can be appreciated.

Stored within the data store 149 are social network data 153 and social network templates 156. The social network applications 146 are configured to generate various network pages from the social networking templates 156 and the social network data 153. To this end, the social networking applications 146 can provide browser access to a number of different social network applications as will be described.

In one embodiment, the social network applications 146 interface with the contest server 103 in order to obtain network page inserts therefrom that are inserted into the social network pages that are served up to the client 109. Alternatively, the network pages served up to the client 109 by the social networking server 106 may include a reference to the network page inserts from the contest server 103. The browser in the client 109 may interpret the reference to obtain the relevant portion of the network page directly from the contest server 103. In either approach, a contest that is staged by the contest server 103 may be inserted into the network pages associated with a social networking site served up by the social networking server 106.

The client 109 may comprise, for example, a computer system such as a laptop, desktop, personal digital assistant, mobile telephone, or other handheld device with similar capability. Implemented in the client 109 is, for example, an application that provides network access to various network pages generated by the social networking servers 106 and the contest servers 103. Such an application may comprise a browser 163 or other application that provides such network access.

Next, a basic description of the operation of the various components of the networked environment 100 is set forth according to the various embodiments of the present invention. The social networking server 106 serves up several different network pages that make up a social networking site as can be appreciated. Several users may sign up to have access to the services offered by the social networking site. Such users typically identify themselves with respect to a given social networking site by specifying a username and a password when they first sign up with the site as can be appreciated.

To receive the benefits of a social networking site, individuals often provide information about themselves to the social network server 106 in the form of a personal profile. Many individuals that provide information about themselves may have information in common with other individuals who participate in the social networking site. For example, many individuals who participate in a given social networking site may have graduated from the same university or are involved in the same civic organizations, etc. Such individuals are socially connected by virtue of their common interest or background. The social connections between individuals effectively make up social networks within the social networking server 106.

As contemplated herein, a "social network" refers to a social connection between individuals. In this respect, a social network may exist by virtue of the fact that individuals are associated with each other in that they are all associated with the same organization or have a common background. For example, all individuals who graduate from Harvard University are all within the social network of Harvard University graduates. Similarly, those who are members of a given stamp collecting club are members of such social network by virtue of the fact that they are members of the same club. Such a social connection among individuals may be identified based upon common information in the profiles of individuals who sign up with the social networking site.

In addition, a "social network" may also include connections between two or more people by virtue of friendships or other relationships between such individuals. In this sense, the boundaries of such a social network are somewhat amorphous, depending upon the friendships of individuals included within the network. For instance, if one wishes to start a contest with a friend, then one can configure such a contest and challenge the friend to the contest. During the contest, both initial players can invite other friends to join our respective teams. Each person that accepts an invitation to join one of the teams can in turn invite their own friends to join their respective team. Thus, the social network associated with a team in this sense comprises the network of friends associated with the original team member. In this respect, the social network is limited to those who are invited to the game by an existing team member. Thus, membership on a given one of the teams is restricted to a given social network of individuals based upon friendship or other association between individuals. Also, it should be noted that a social network is at least a subset of the general public.

The social networking server 106 also may provide various applications that facilitate interaction between individuals who sign up to be part of the services offered therein. For example, such individuals may be involved in various applications such as chat rooms, e-mail applications, calendar applications, and other applications. Also, the social networking site may sponsor or announce the existence of various events in which users of the site may participate.

The social networking site provided by the social networking server 106 may include content from the contest server 103 that is configured to stage contests in which the various individuals who are associated with the social networking site can participate. In one embodiment, access to the contests is restricted to members of respective social networks existing in the social networking server 106. Such contests allow individuals who are members of respective social networks to work together as a team during the staging of a contest, thereby facilitating bonding between individual members of respective social networks existing in the social network site. Given that individuals associated with various social networks may identify with and have a degree of pride in their organization, etc., then the contests between members of respective social networks can leverage the feelings of individuals toward their social network to spur on greater participation in various contests. According to one embodiment, the social networks are external to the contests in that they exist outside of the context of any given contest and are not formed by existing participants within a given contest.

The contest servers 103 provide the contest content that is seen in network pages of the social networking site. To this end, the contest applications 126 executed in the contest server 103 communicate with the social networking server 106 in order to obtain social network data 153 about various individuals so as to be able to set up contests between various social networks existing in the social network site. Also, in building the network pages 159 that are served up to clients 109, the social network applications 146 may interface with the server application 123 and the contest applications 126 in the contest server 103 in order to obtain contest network page inserts 161 associated with a contest. The contest network page inserts 161 are inserted into various network pages 159 that are served up to the client 109.

To stage the contest that is served up as part of the social networking site, the contest server 103 interfaces with the social networking server 106 to obtain needed social network data 153. In one embodiment, participation into a given contest staged by the contest server 103 is restricted to individuals that are included in two or more social networks. Specifically, the membership of each one of the two or more teams in a given contest staged by the contest server 103 is associated with a respective one of a plurality of social networks that exist within the social networking site as will be described.

The client 109 sees the contest as part of the network pages 159 obtained from the social networking servers 106. To this end, the individual that operates the client 109 may be entirely unaware that the contest servers 103 that facilitate the contests are operated by an entity that is separate from the entity that operates the social networking server 106. In this sense, the contest content included in the network page inserts 161 are seamlessly inserted into the network pages 159 generated by the social networking server 106 as it is served up to the client 109.

Figure 2:
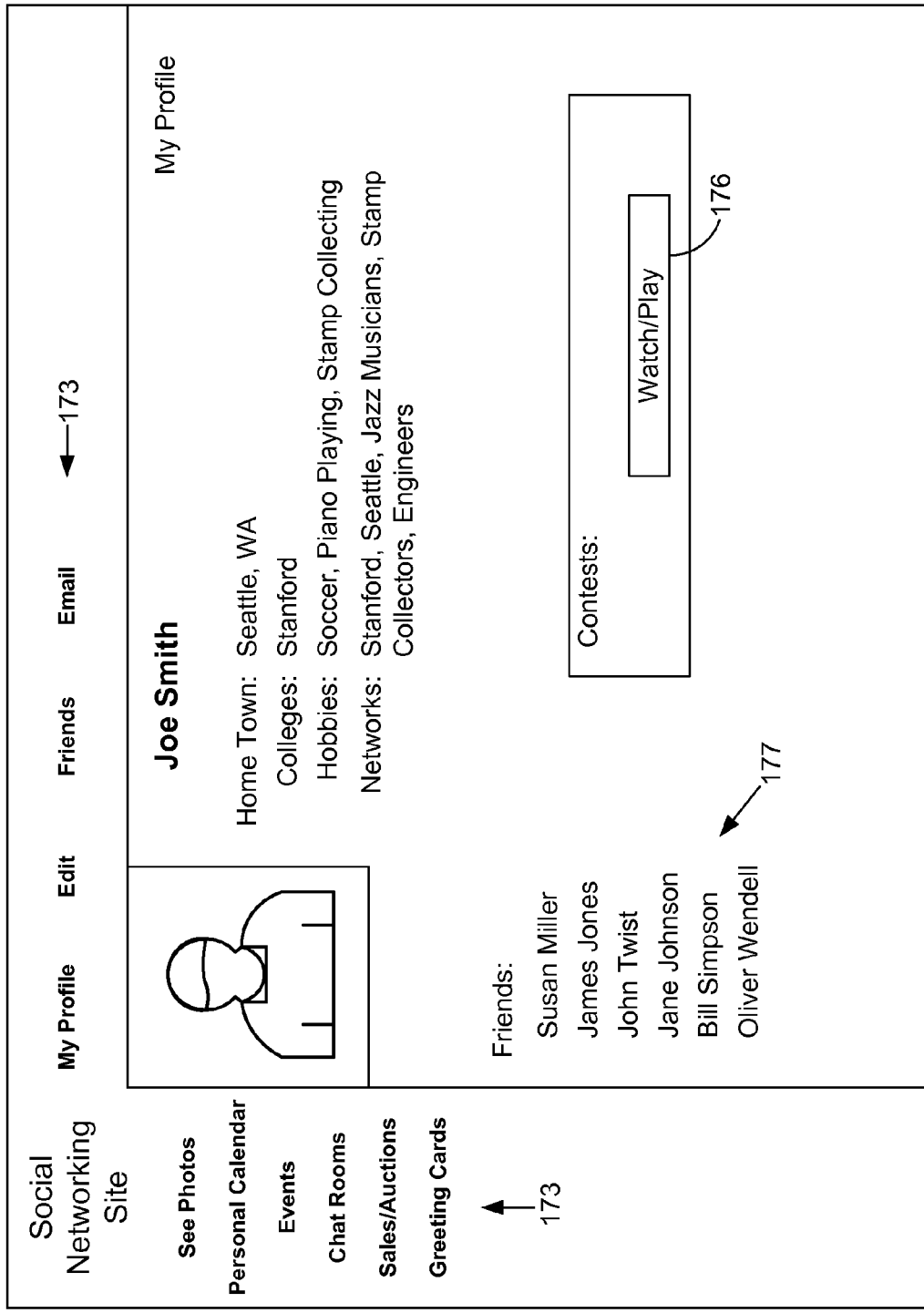
FIG. 2 is a drawing of an example of a network page served up by the social networking server of FIG. 1 according to an embodiment of the present invention.

With reference to FIG. 2, shown is one example of a network page 159 that is generated by the social networking server 106 according to an aspect of the present invention. As shown, the network page 159 identifies a number of different types of social networking applications 173 that are provided for use by the individual that may have signed up for the services offered by the social networking site. Such services may comprise, for example, photo viewing applications and storage, personal calendars, announcements, chat rooms, sales/auctions, the creation of greeting cards, communications with friends, e-mail, and other applications.

As depicted in FIG. 2, the network page 159 includes a profile portion in which an example of a personal profile of an individual user is illustrated. In this example, the name of the user is "Joe Smith" and includes information about such user such as his hometown, Seattle, Wash., and the fact that he graduated from Stanford University. Also listed are Joe Smith's hobbies, such as soccer, piano playing, and stamp collecting. By virtue of the fact that Joe Smith has identified his affiliations with various locations and organizations, Joe Smith has become part of the social networks associated with such affiliations. For example, Joe Smith is part of a social network of Stanford graduates, people who live in Seattle, and people who collect stamps. In addition, Joe Smith may manipulate the various network pages 159 of the social networking site in order to participate in other social networks such as "Jazz Musicians" and "Engineers." Still further, Joe Smith can manipulate the various network pages 159 of the social networking site to identify his friends 177 that also participate in the social networking site.

Given that hundreds of thousands, if not millions, of users may sign up for the social networking services offered by a given social networking site, each of the social networks may include any number of different members. Each of the profiles of the individuals that use the social networking site are stored in the social network data 153 (FIG. 1).

The network page 159 also includes a contest access mechanism 176 which may comprise, for example, a link or a button as can be appreciated. The contest access mechanism 176 enables a user to cause the social networking server 106 to serve up a respective network page 159 that includes a respective contest network page insert 161 as described above. In this sense, the contest access mechanism 176 is presented to a user so that the user may initiate access to the functions of the contest server 103 in staging various contests as will be described.

Figure 3:
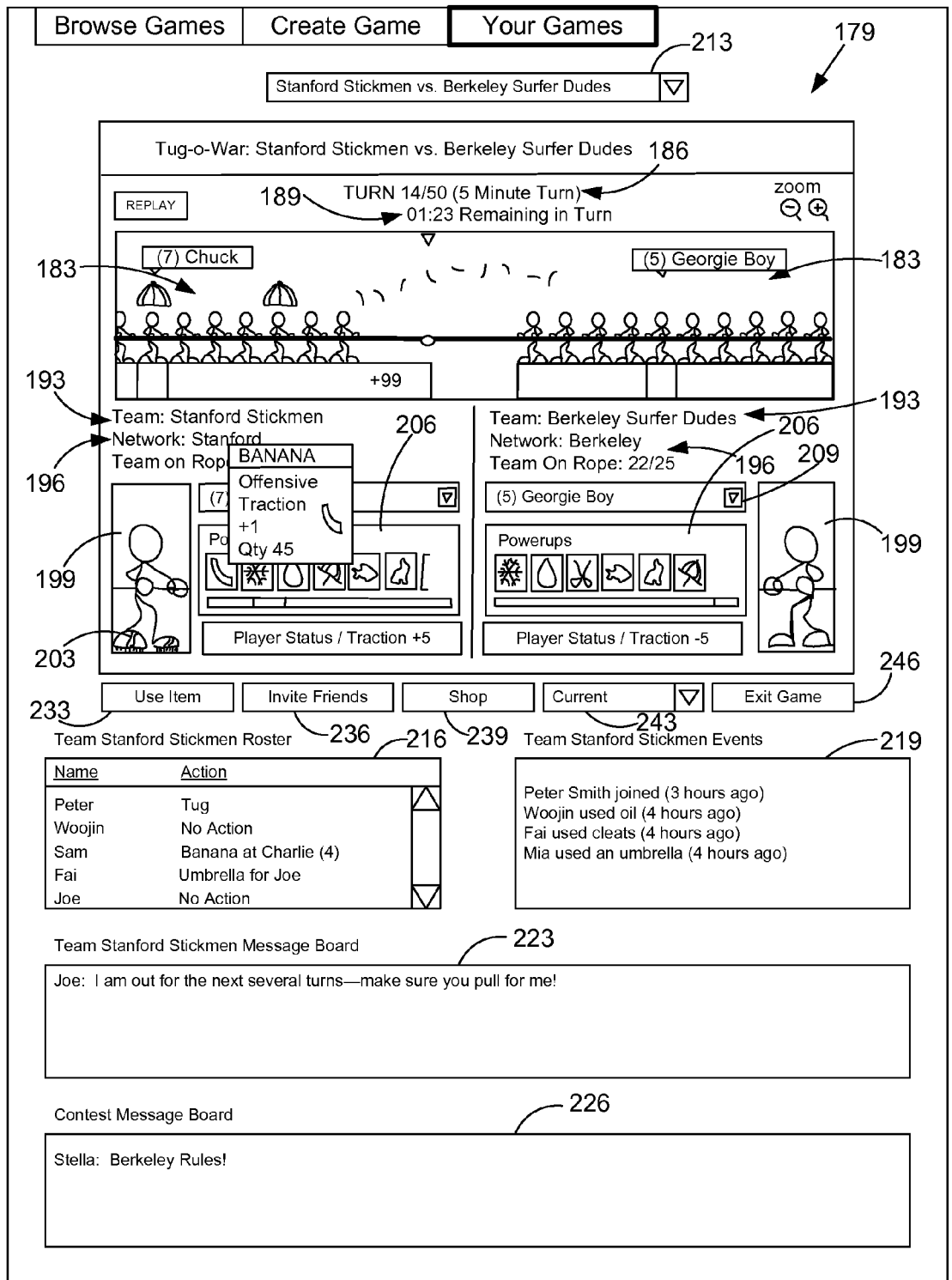

With reference to FIG. 3, shown is one example of a network page insert 161a that may be generated by the contest server 103 (FIG. 1) and inserted into a network page 159 (FIG. 1) generated by the social networking server 106 (FIG. 1). The network page insert 161a includes information about an ongoing contest 179 between two teams 183.

The contest 179 requires each of the teams 183 to achieve a predefined goal. For example, in the illustration depicted with respect to FIG. 3, the contest 179 is a game of tug-o-war. The predefined goal is to pull the rope a specific distance in the direction of ones team 183. It is understood, however, that the tug-o-war is merely an example of the various types of contests that may be implemented according to the various embodiments of the present invention. For example, other types of contests that may be implemented include races between virtual automobiles or other objects, races to build structures, virtual warfare/battles, or other types of contests.

Contests 179 may also be modeled after board games as are known by those with ordinary skill in the art that require the input of team members.

Regardless of the type of contest, the contests 179 essentially allow a team 183 of individuals associated with a given social network to work together in order to achieve a goal. Such activity enhances the interpersonal interaction between members of various social networks associated with the social networking site (FIG. 2).

Either the contest server 103 or the social networking server 106 may be configured to issue a virtual currency that is used by individual players for various purposes associated with the staging of the contests 179. For example, individuals may be charged an entry fee comprising a predefined amount of virtual currency to take part in a contest 179. Also, individuals may use the virtual currency to purchase implements used during a given contest 179. In order to provide individuals with an initial amount of virtual currency, a predefined amount of virtual currency may be issued to each individual that signs up to use the services of the social networking site.

The contest 179 can be turn-based or it may be performed in real time. For a turn-based contest 179, a turn time interval is specified when the game is created. During each time interval, each player is allowed to enter in their particular move. At the end of each time interval, a contest application 126 in the contest server 103 calculates a new state of the contest 179 based on the moves by the individuals of the respective teams 183.

For example, in the context of tug-o-war, during turn a user may select an action that affects how their team can pull the rope. When a turn is over, then the new position of the rope is calculated based on the actions taken by each individual in the respective teams 183.

Alternatively, the game may be implemented in real time, where each action taken by a team member causes the state of the contest 179 to be calculated in real time. Consequently, the state of the contest 179 is continually updated during the course of the contest 179 until one of the teams 183 achieves the predefined goal and wins the contest 179, or the contest ends in a draw or forfeit, etc. Thus, according to one embodiment, the contest 179 is won by a given team 183 when the team 183 achieves the predefined goal before any of the other teams 183 involved in the contest 179.

When staging the game, the contest server 103 calculates the state of the contest 179 during each turn or in real time as described above. Where the game is turn-based, the current turn 186 is noted in the network page insert 161a. Also, in association with the current turn 186, the amount of time remaining in the current term 189 is also noted.

The progress of the contest 179 is calculated after each turn 186 or in real time based upon various factors associated with the contest 179. For example, with respect to the specific case of a game of tug-o-war, the factors that affect the movement of the rope may comprise, for example, the number of players on each side of the rope, as well as the traction experienced between the virtual feet of each player and the virtual ground. In addition, other factors may be brought to bear on the progress of the rope in either direction as can be appreciated. At the end of each turn 186, the new position of the rope may be calculated based upon the current state of each of the relevant factors depending on the various actions of the players. According to various embodiments, during a given turn 186, each player on a given team 183 can employ one or more virtual tools that affect the status of the contest 179.

The virtual tools employed may be offensive or defensive in nature. For example, the tools may be offensive such that they inhibit the progress of an opposing one of the teams in achieving the predefined goal to win the contest 179. Also, the virtual tools may be defensive in nature in that they counter or block the effect of offensive tool used against one's team by an opposing team 183. The virtual tools may be issued to individuals initially, or may be purchased by individuals using the virtual currency or real currency such as US dollars.

According to one embodiment, when an individual pays for a virtual tool to use in the contest 179, the fee paid to purchase the virtual tool is added to the amount of virtual currency awarded to the individuals that are members of one of the teams 183 that wins the contest.

For example, in the specific case of tug-o-war, individual team members may throw various items at the other team to affect the virtual traction they experience relative to the virtual ground. One such virtual tool might comprise a virtual banana that an individual may throw at members of another team to cause one of the opposing team members to slip, thereby affecting the traction of such opposing team member. Also, another individual on the other team may employ a defensive virtual tool such as an umbrella that prevents the banana from falling on a given player and keeps that person from experiencing a loss of traction. Thus, the virtual tools that may be employed by the various members of the teams 183 may be offensive or defensive in nature.

Also, a virtual tool may be offensive to the extent that it increase the ability of a given team to perform. For example, such a virtual tool in the context of tug-o-war might involve cleats that can be worn by team members. Specifically, one or more members of a team may decide to wear cleats to provide for greater traction during the course of a contest of tug-o-war to give their team 183 an advantage.

The virtual tools may be durable or consumable. A durable tool is one that lasts at least one contest 179. Such tools may include, for example, the types of shoes worn by the individual players that provide for a greater amount of traction, for example, as in the case of a contest of tug-o-war. Consumable virtual tools are those that last only for a single use, such as a banana or an oil can that can be thrown only once at another team to affect the virtual traction that they have with the virtual ground.

The network page insert 161a also indicates a team name 193 for each of the teams 183. The team names are specified when the contest 179 at the time that a contest 179 is first created as will be described.

In addition, the network page insert 161a also lists the social network 196 associated with each of the teams 183. In this respect, the membership to each one of the teams 183 is restricted to the individuals that are associated with the social network 196. Where the social network 196 is based upon friendships, then the name of the person who originated the game may be listed as the name of the social network 196. The social networks 196 are taken from those that exist in the social networking server 106 or are based on the friendships noted in the social networking server 106. In this sense, each of the teams 183 can only be made up of individuals that also exist within a corresponding social network that exists or can be created using the data within the social networking server 106. As was stated previously, the social networks 196 are external to the contests 179 in that they exist outside of the context of any given contest 179 and are not formed by existing participants within a given contest 179.

The network page insert 161a also depicts an avatar 199 for each of the individual players included on a given one of the teams 183. Each of the avatars 199 can be "dressed up" by individuals that they represent. To this end, the contest server 103 is configured to offer virtual accents for sale to those individuals that they represent. The virtual accents may be purchased using virtual currency or real currency such as US dollars.

For example, one virtual accent 203 may comprise, for example, stripes on shoes that an individual may purchase in order to make their avatar 199 to look more appealing. Also, the virtual accents 203 may be purchased in coordination with virtual tools such as, for example, cleats. The contest server 103 maintains an inventory 206 of the virtual tools that have been issued to or purchased by a given individual. Thus, each individual can keep track of the virtual tools that are at their disposal during a given contest 179.

In addition, the network page insert 161a allows various individuals to determine the status of each one of the individuals on the respective teams 183 by using a name selector 209 so that one individual may select another individual on a given team 183 to view their status. In the context of a tug-o-war game, the selected name displayed in the name selector 209 thus allows one to see the inventory 206 of virtual tools and the current traction rating of the player.

Also, the avatar 199 of the selected player is depicted so that individuals may view the avatar 199 representative of such individual. The network page insert 161a also includes a contest selector 213 that may be manipulated so that a user may select any one of a number of concurrent contests 179 to view in which the user is a participant. The current selected contest in the contest selector 213 is thus depicted in the network page insert 161a.

The network page insert 161a also includes a team roster box 216 in which the players of the team 183 that includes the user are listed, as well as the action specified by the given players of such team to be implemented at the end of the current turn 186. Also, the network page insert 161a includes an event window 219 that lists individual events that occurred with respect to the team 183 over a period of time so that an individual may keep track of the actions taken by other team members during the course of the contest 179.

The network page insert 161a also includes a team message board 223. The team message board 223 provides a venue by which team members of a given one of the teams 183 can communicate to each other. The communications between team members using the team message board 223 is not disclosed to members of the opposing team. The network page insert 161a also includes a contest message board 226 that may be used to communicate among all of the members of each team involved in a given contest 179. Such a message board may be employed by individuals to taunt the other side, for example, during the course of a given contest 179.

The network page insert 161a also includes a number of buttons that may be manipulated by a participant to implement various functions with respect to the contest 179. For example, the buttons include a "use item" button 233 that may be manipulated in order to select a given virtual tool or other item to be employed during the course of the contest 179. Also, the buttons include an "invite friends" button 236 that may be manipulated in order to invite friends of a given participant into the contest 179. The "invite friends" button 236 causes the generation of various user interfaces (not shown) that enable a given individual on one of the teams 183 to invite friends to join the contest 179. In the case of a social network comprising friends of players, the individual's friends may be invited.

The network page insert 161a also includes a "shop" button 239 that is manipulated to allow individuals included in the contest 179 to purchase or otherwise obtain virtual tools to be placed in the respective inventories 206 of the individuals. Alternatively, other items may be purchased as will be described.

The network page insert 161a also includes a view selection button 243 that may be manipulated for a user to select a current turn to be viewed relative to all of the turns that have already occurred in the past with respect to a given contest 179. Also, the network page insert 161a includes an "exit game" button 246 that may be manipulated by a given individual who wishes to leave the contest 179. In this sense, individuals can join a contest 179 and play for as long as they wish and they may leave the contest 179 while it is still ongoing. However, it may be the case that if a person leaves a contest 179, they may forfeit their entry fee.

If someone leaves a contest 179, it will continue on with the remaining participants from the respective social network 196 until the game ends. Thus, the membership on a given one of the teams 183 may change significantly during the course of the contest 179. However, even though the membership may vary, all of the members of the team 183 at any time are still members of a respective social network 196. This is because membership to a given team 183 is restricted to members of a given social network 196.

Figure 4:
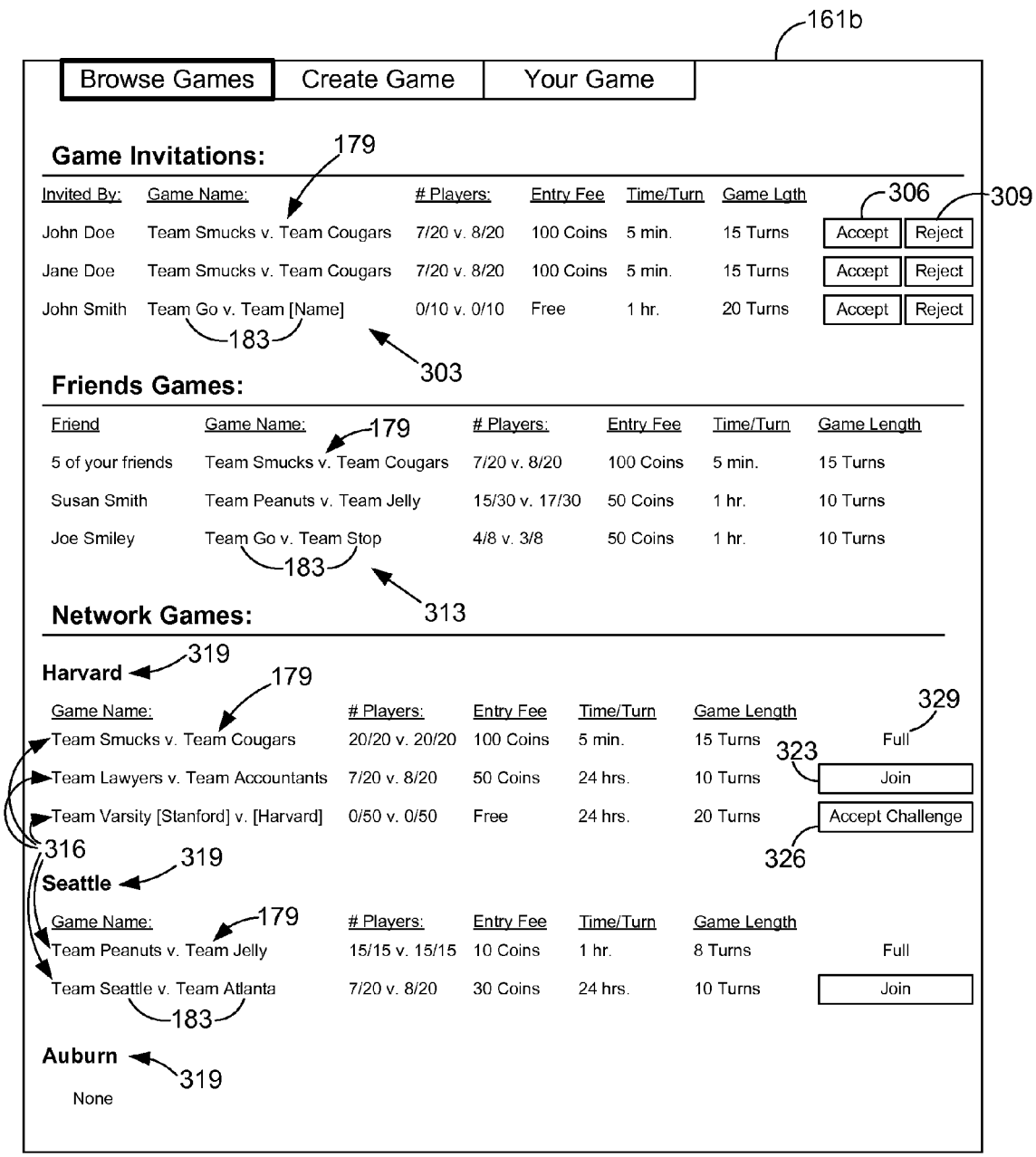

Referring next to FIG. 4, shown is a second network page insert 161b that allows an individual to browse the contests 179 that are associated with the individual in some manner. Specifically, the contests can be associated with the individual in that they may be invited to join a contest 179, their friends may be involved with the contest 179, or a social network to which the individual belongs may be involved.

In a first portion, the network page insert 161b lists a number of invitations 303 to join specific ongoing contests 179. Each of the invitations 303 lists an individual who has invited the user and the name of the contest 179. Each invitation 303 also includes the number of players currently playing for each team 183 (FIG. 3) relative to the total number of players that can play on each team 183, and the entry fee needed to enter the contest 179. The entry fee may be specified in terms of virtual currency or real currency such as U.S. Dollars.

In addition, each invitation 303 includes the time for each turn (assuming a turn-based contest 179) as well as a total length of the contest 179. The total length of the contest 179 specifies a maximum number of turns the game will be allowed to run before a stalemate is declared again assuming a turn-based game. The user may manipulate either an "accept" button 306 or a "reject" button 309 associated with each of the invitations 303 in order to either accept the invitation and join a team, or reject the invitation.

An invitation 303 may also comprise a challenge from a friend to start a new contest 179. In such case, the invitation 303 may only include the team name entered by the challenger and, if accepted, the user would enter a team name and become the captain of the team. At such time, the user can then invite their friends to join the contest 179 and, when a minimum quorum of players is reached for each team in the contest 179, the game will commence.

It is possible that a given individual might receive an invitation to join both sides of a given contest 179 by the individuals on the respective teams. In such case, the contest applications 126 are configured to prevent such an individual from accepting more than one invitation to a given contest 179. For example, if one invitation to a contest is accepted, then all other invitations to the same contest 179 may be rendered void.

In addition, the network page insert 161b includes a number of "friends" contests 313 that simply list the contests 179 in which the given user's friends are competing. Each of the friends contests 313 lists the friend or identifies the fact that two or more friends of the given user are competing in the given contest 179. Also, each of the friends contests 313 is identified by contest name, the number of players per team currently competing, the entrance fee, the time-per-turn assuming a turn-based game, and the total turns per game assuming a turn-based game. If a person wishes to join the contest with their friends, they can contact such friends through the various mechanisms of the social networking site and ask to be invited.

The network page insert 161b also includes a listing of social network contests 316 that include contests 179 in which membership to one of the teams 183 (FIG. 3) is restricted to a corresponding social network 319 listed in the network page insert 161b. The social networks 319 listed are those networks to which the given user belongs. As such, the contests 179 listed under each social network 319 are those contests 179 that include a team 183 that comprises only members of the respective social network 319.

Each of the social network contests 316 is listed in terms of the names of the teams 183, the number of players currently on each team 183, the entry fee charged to participants to enter the respective social network contest 316, the time period per each turn (assuming a turn-based contest), and the total number of turns for the contest 179 (assuming a turn-based contest). In addition, the social network contest 316 may include a "join" button 323, an "accept challenge" button 326, or a "full" indicator 329.

The join button 323 may be manipulated by the user in order to join the respective social network contest 316. If a user manipulates the join button 323 indicating that they wish to enter the respective social network contest 316, then the client 109 (FIG. 1) sends a message to the contest server 103 (FIG. 1), either directly or through the social networking server 106 (FIG. 1), indicating that the user wishes to join the respective social network contest 316. The respective contest applications 126 (FIG. 1) in the contest server 103 will then associate the given user with the respective social network contest 316. Thereafter, the social network contest 316 will appear as one of the contests that may be accessible by the user by way of the network page insert 161a (FIG. 3) as described above.

In addition, the social network contest 316 that includes the "accept challenge" button 326 is a contest 179 that has been created by an individual from another social network 319 who has challenged the social network of the user to the contest 179. In the example of FIG. 4, one of the social network contests 316 involves a challenge from a team called "Varsity." The membership to the Varsity team is restricted to "Stanford" which presumably involves those who attended Stanford University.

Thus, an individual who belongs to the social network 319 of Stanford has challenged those who are members of the social network "Harvard" to a contest 179. Since this respective social network contest 316 has not started, the number of players indicated for each team is zero. Also, the entry fee, time per turn, and game length is specified in association with the challenge. The challenge to the contest will appear in the interface, and thus is presented to each member of the Harvard social network 319 that accesses the network page insert 161a (FIG. 3) while accessing the social networking site served up by the social networking server 106 (FIG. 1).

The first individual who is part of the Harvard social network 319 to manipulate the accept challenge button 326 becomes the team captain of the new Harvard team. This person is afforded an opportunity to name the team on the behalf of the Harvard social network 319 and such user is identified as the team captain. Once an individual has accepted such a challenge, then the entry under the social network 319 in the network page insert 161b is changed to appear like the other social network contests 316 that are ongoing in which a join button 323 is depicted to allow other members of the respective network to join the contest 179. In one embodiment, the contest 179 will not begin until a minimum quorum of individuals has joined each team 183 so that a legitimate contest 179 may be undertaken.

The "full" indicator 329 is associated with social network contests 316 in which there is no more room for further players. The total number of players on each team 183 is specified when the respective contests 179 are created. Once the number of players on a team 183 associated with a given social network 319 has reached this maximum number, then the full indicator 329 is placed next to such social network contest 316. This is because the team 183 in the social network contest 316 associated with the respective social network 319 has reached maximum capacity. This ensures that individuals in the respective social network 319 do not attempt to join the game when there is no more space available. If one of the participants should exit the contest, then the "full" indicator 329 would be replaced with a "join" button 323 as described above.

In addition, the team names of each contest 179 may be configured as a link that may be manipulated by an individual to view the game. In this respect, a user can manipulate a link to gain spectator access to a respective contest 179 to watch what happens. In order to provide spectator access, the network page insert 161a (FIG. 3) may be generated on the client 109 (FIG. 1) of the spectator so that they can follow the contest 179 with the exception that the team message boards 223 may be omitted therefrom. This is advantageous as an individual might be spurred on to join the contest 179, etc.

With reference to FIG. 5, shown is an additional network page insert 161c that is manipulated by a user in order to create a contest 179 (FIG. 3). The network page insert 161c includes a team name field 353, a maximum number of players per team field 356, a time between turns field 359, a length of the contest field 363, and an entrance fee field 366. The team name field 353 allows an individual to specify the name of their team. The team name is restricted to a given number of characters as is deemed appropriate.

The maximum number of players per team field 356 allows a user to specify a maximum number of individuals that can join each team during the contest 179. Also, a maximum limit may be associated with this field to prevent users from allowing too many individuals to join the contest 179 as is deemed appropriate. The time between turns field 359 and length of contest field 363 allow a user to identify the specific time period between each turn and the number of turns per game, assuming a turn-based game. Where a game is played in real time, then these fields may be eliminated.

The entrance fee field 366 allows a given user to specify the entry fee to be paid to join the contest 179. In this respect, the user can specify a significant entry fee which increases the stakes associated with the game. The entry fee can be paid in terms of virtual currency issued by the contest server 103 (FIG. 1) or the social networking server 106 (FIG. 1) other server as can be appreciated. Alternatively, the entry fee can be specified in real currency such as US Dollars.

The network page insert 161c also allows the user to select the type of network that is to be involved in the contest created. To this end, the network page insert 161c allows a user to select one of two options 373. The first option 373 entails creating a contest 179 between networks of friends.

The second option 373 entails creating a contest 179 between respective social networks 319 (FIG. 4). Assuming that an individual has opted to create a contest 179 between social networks 319, then the network page insert 161c presents a pick list 376 that lists each of the social networks 319 associated with the user. These social networks 319 are obtained by the contest server 103 from the social networking server 106.

Specifically, when the contest server 103 creates the network page insert 161c to be inserted into a respective network page 159 from the social networking server 106, the contest server 103 is configured to request the social networks 319 associated with the individual. Alternatively, such information may be obtained at another time such as, for example, when the user first begins interacting with the social networking site and the contests 179 by virtue of the manipulation of the content access mechanism 176 (FIG. 2).

In order to ensure that the social networks 316 listed in the pick list 376 are up to date, each time the user first accesses the contests provided by the social networking server 106 by virtue of its interaction with the contest server 103, the contest server 103 can request updated social network and friend information with respect to the given user so that the information displayed in the social network pick list 376 is accurate. In addition, the network page insert 161c presents a challenger network field 379 by which the user may specify a respective social network 319 to challenge in the instant contest 179. A search function or browse function may be associated with the challenger network field 379 to allow a user to search through the various social networks 319 existing in the social networking server 106 to challenge for the contest 179.

Alternatively, if the user selects the option 373 indicating a contest between friends, then the contest server 103 will generate user interface components in the network page insert 161c that allows the user to browse a list of individuals they have indicated as friends on the social networking server 106 in order to identify one of the friends to challenge to a contest 179. Thereafter, the challenger and the individual challenged can invite other friends to join the game to expand the respective social networks associated with each team 183 of the respective contest 179. The list of friends can be obtained from the social networking server 106 at the same time and in the same manner as the social network information associated with the individual as described above.

Once the user has successfully specified all the necessary parameters in order to issue a challenge to a respective friend or social network so as to begin a contest 179, then the user may manipulate the "submit" button 383. By virtue of this action, the respective friend or the individuals associated with the challenged social network 319 (FIG. 4) are issued a challenge or invitation that may be accepted in order to commence competing in the contest 179.

In this manner, a user is advantageously provided with a way to implement a contest 179 between various social networks, whether they involve commonly shared backgrounds or a group of friends without having to go through the hassle of contacting each individual person to join the game. Such might actually be impossible in the case where, for example, alumni from Harvard University wish to challenge alumni from Stanford University to a contest 179, where individuals from Harvard might know few if any people from Stanford that could be invited.

With reference to FIG. 6, shown is an additional network page insert 161d in which an individual who accepts a challenge on behalf of a social network 319 (FIG. 4) or a challenge that was issued by a friend can enter the name of a team 183 to compete in the contest 179 (FIG. 3). Once the name of the team 183 is entered, then the user may click on the submit button 386 to record the name of the team 183 in the contest 179. The contest will then start when the minimum quorum of individuals is established for each team 183 involved in the given contest 179.

With reference to FIG. 7, shown is a network page insert 161e that presents a virtual store according to an embodiment of the present invention. The network page insert 161e is generated when the user manipulates the "shop" button 239 (FIG. 3) in order to access the virtual store presented by the network page insert 161e. The virtual store presented by the network page insert 161e allows an individual to buy various virtual items to be used during the course of one or more contests 179. As shown, the virtual store represented by the network page insert 161e lists various virtual tools for purchase. These virtual tools comprise both consumable virtual tools 403 and durable virtual tools 406.

The consumable virtual tools 403 are those that may be employed once during the course of a given contest 179. The durable virtual tools 406 are those that may be employed during the entire course of a given contest 179 or during the course of multiple contests 179. Each of the virtual tools 403 and 406 may act as an aid in achieving the predefined goal on the part of a given team 183 (FIG. 3). For example, some of the virtual tools 403/406 may be offensive in nature such that, when employed, they inhibit the ability of an opposing team to achieve the predefined goal and win the contest 179. Alternatively, some of the virtual tools 403/406 are defensive in nature in that they counter the use of virtual tools 403/406 by an opposing team to negate the ability of a given virtual tool 403/406 to inhibit the progress of one's team 183.

Still other virtual tools 403/406 are offensive tools in the sense that they enhance the ability of one to perform during the course of the contest 179. For example, the durable virtual tools 406 may include "cleats." In the context of a tug-o-war contest 179, the cleats will provide for greater traction for an individual on a given team 183 and thus will benefit the respective team 183 of the person who wears the cleats.

The network page insert 161e also provides for the ability of individuals to purchase the respective virtual tools 403/406. Such tools may be purchased using virtual currency or real currency such as US Dollars as indicated. In addition, the network page insert 161e includes a listing of the inventory of the virtual tools 403/406 that are currently owned by a given user. Also, the network page insert 161e also lists the statistics 409 associated with the performance of the individual in previous contests as well as the amount of virtual currency currently held by the individual. By offering the various virtual tools 403/406 for sale, according to one embodiment, a revenue generating component may be associated with the respective contest 179.

Figure 8:
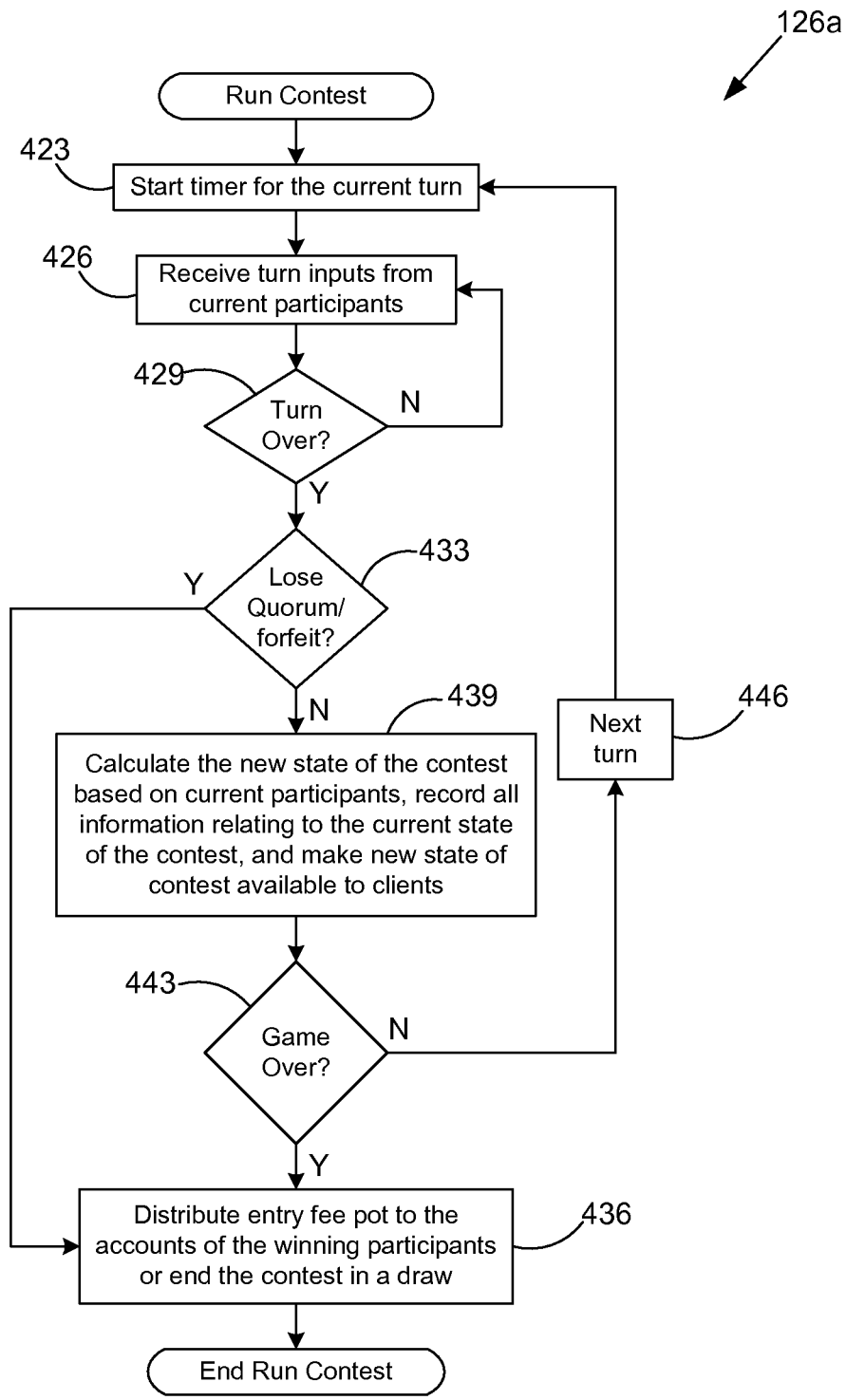
FIGS. 8-13 are flow charts that provide various example illustrations of the operation of respective contest applications executed in the contest server of FIG. 1 according to various embodiments of the present invention.

Referring next to FIG. 8, shown is a flow chart that provides one example of the operation of a contest application 126 (FIG. 1), denoted herein as contest application 126a, that is implemented to stage a turn-based contest 179 as described above according to an embodiment of the present invention. Alternatively, the flow chart of FIG. 8 may be viewed as depicting steps of an example of a method implemented in the contest server 103 (FIG. 1) to stage a turn-based contest 179.

In addition, various examples of the functionality of the contest applications 126 implemented in the contest server 103 are described herein with reference to various flow charts. As depicted by the example flow charts to be described, the functionality represented may be implemented, for example, in an object oriented design or in some other programming architecture. Assuming the functionality is implemented in an object oriented design, then each block in a flow chart may represent functionality that may be implemented in one or more methods that are encapsulated in one or more objects as can be appreciated.

With specific reference to FIG. 8, beginning with box 423, a timer is initiated for the current turn associated with the contest 179. Alternatively, a time stamp may be issued with respect to an ongoing clock so that the start time of the current time period may be noted, where the end time of the current time period is calculated based on the start time stamp.

Thereafter, in box 426, the contest application 126a receives inputs from all of the current participants of the respective contests 179 during the current turn. The inputs are received from the "current" participants given that the participants of a respective contest 179 may change over time as individuals enter or exit the contest 179. In box 426, each individual currently associated with a given contest 179 may indicate whether they wish to use various virtual tools or perform other actions as desired.

Then, in box 429, the contest application 126a determines whether the current time period has expired. If so, then in box 433, the contest application 126a determines whether the quorum of players on either team 183 (FIG. 3) associated with a given contest is below that required to compete in the contest 179. This reflects the fact that players can enter and leave a given contest 179 while the contest 179 is ongoing. If a given team 183 suddenly finds itself without enough players to compete, then such team may be deemed to have forfeited the contest 179 to the opposing team(s) 183. Assuming that a quorum is lost by a respective one or both of the teams in box 433, then the contest application 126a proceeds to box 436. Otherwise, the contest application 126a proceeds to box 439.

Alternatively, box 433 may be removed such that once a contest 179 has begun, it will proceed until it is over and will not be forfeited due to a loss of quorum by any one team 183. In such case, it is probable that the team 183 with the number of players that has fallen below the quorum needed to start a contest 179 will be significantly understaffed and may be at a significant disadvantage. If box 433 is removed as suggested, then the contest application 126a proceeds directly from box 429 to box 439.

In box 439, the contest application 126a calculates the new state of the contest 179 based on the actions of the participants on each of the teams 183 during the turn. The information relating to the current state of the contest is recorded in the data store 129 (FIG. 1) and is made available to the clients 109 associated with the participants of the contest 179.

For example, in the case that the contest 179 involves a tug-o-war, then the progress of the rope may change based upon actions taken by the respective participants. The location of the rope may thus be recorded to indicate the current state of the contest and the position of the rope is thus made available to the clients 109 to be displayed to the participants in the network page insert 161a as described above.

In box 443, the contest application 126a determines whether the contest 179 is over. A given contest 179 may be over if the total number of turns specified for the contest 179 has occurred, or if one of the teams 183 has achieved the predefined goal before the other team(s) 183. If the total number of turns specified for the contest 179 has occurred, then the team 183 that is the closest to achieving the predefined goal may be declared the winner. If the contest 179 is not over, then the contest application 126a proceeds to box 446 in which the next turn is commenced. Otherwise, the contest application 126a proceeds to box 436.

In box 436, the entry fees paid by each of the individuals of the losing team are distributed to the accounts of the winning participants. In this sense, the entry fees are added to a "pot"

that is distributed to the winning participants. Also, according to one embodiment, all fees paid for virtual tools may be added to the pot and distributed to the accounts of the winning participants. In one embodiment, only the participants of the winning team who did not leave the contest 179 before it ended receive the proceeds. The entry fees are distributed in case one team actual wins or in the situation that another team forfeits.

The entry fees of all individuals are distributed to a winning team, including the entry fees paid by individuals who left the losing team 183 before the end of the contest 179. As such, in one embodiment, individuals who leave a contest forfeit their entry fee. Also, each entry fee entered by an individual who entered the game at any given time on the side of a forfeiting team 183 may also be forfeited to the members of the winning team. Note that if both teams lose a quorum in box 433 resulting in an end to the contest 179, then in one example, in box 436 the game may be declared a draw and individual participants each will keep the entry fee paid to enter the contest 179. Alternatively, the contest 179 may continue to completion even though both teams have dropped below the quorum needed to start the contest 179. Thereafter, the contest application 126a ends as shown.

Figure 9:
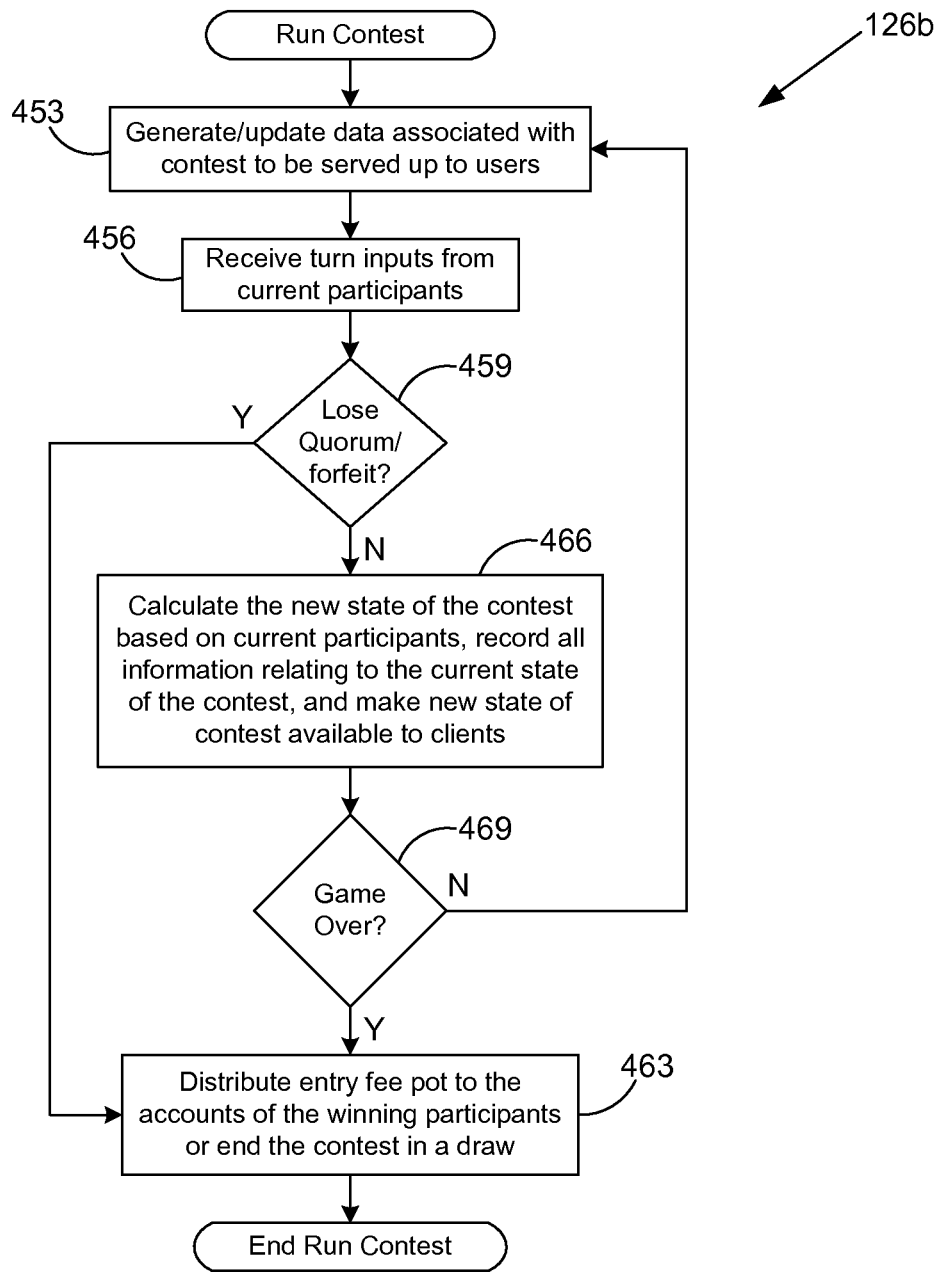

Referring next to FIG. 9, shown is a flow chart that provides one example of the operation of a contest application 126 (FIG. 1), denoted herein as contest application 126b, that is implemented to stage a real-time contest 179 as described above according to an embodiment of the present invention. Alternatively, the flow chart of FIG. 9 may be viewed as depicting steps of an example of a method implemented in the contest server 103 (FIG. 1) to stage a real-time contest 179.

Beginning with box 453, the contest application 126b generates or updates the data with respect to the contest that is served up to the users. Then, in box 456, the contest application 126b receives one or more inputs from the current participants of the contest 179. The inputs are received from the "current" participants given that the participants of a respective contest 179 may change over time as individuals enter or exit the contest 179. Next, in box 459, the contest application 126b determines whether one or more teams 183 to be involved in the contest 179 have lost the needed quorum in order to compete such that they have forfeited the game or that the game has ended in a draw. If such is the case, then the contest application 126b proceeds to box 463.

Alternatively, box 459 may not exist in a similar manner as was discussed above with respect to box 433 of FIG. 8, where a team 183 that falls below the quorum needed to start the contest 179 simply operates at a numerical disadvantage. As such, the contest application 126b proceeds, for example, from box 456 directly to box 466.

Otherwise, the contest application 126b proceeds to box 466 given that at least two teams are still able to compete having the necessary quorum of individuals to do so. In box 466, the new state of the contest is calculated based on the inputs received from the current participants. The information relating to the current state of the contest is stored and made available to the clients 109 (FIG. 1) associated with the respective participants, for example, by virtue of the network page insert 161a (FIG. 3).

Thereafter, in box 469, the contest application 126b determines whether the contest 179 is over. This may occur, for example, if one or more of the teams 183 is able to reach the predefined goal associated with the contest 179 either before another one of the teams 183 or concurrently with another one of the teams 183 (i.e., a tie). Alternatively, the contest 179 may be over if a predefined period of time for the contest 179 has elapsed and the team 183 that is the closest to achieving the predefined goal is declared the winner. If in box 469 it is determined that the contest is over, then the contest application 126b proceeds to box 463. Otherwise, the contest application 126b reverts back to box 453 as shown.

In box 463, the contest application 126b distributes the "pot" that includes the entry fees from the losing participants to the accounts of the winning participants. Also, according to one embodiment, all fees paid for virtual tools may be added to the pot and distributed to the accounts of the winning participants. Where the contest 179 ends in a draw, then each participant retains their entry fee. In one embodiment, the contest 179 will not end in a draw even if the number of participants in each team 183 involved in the contest 179 falls below the quorum needed to start the contest 179. Also, the contest application 126b performs any other functions in a manner similar to the contest application 126a as set forth with respect to box 436 described above.

Figure 10:
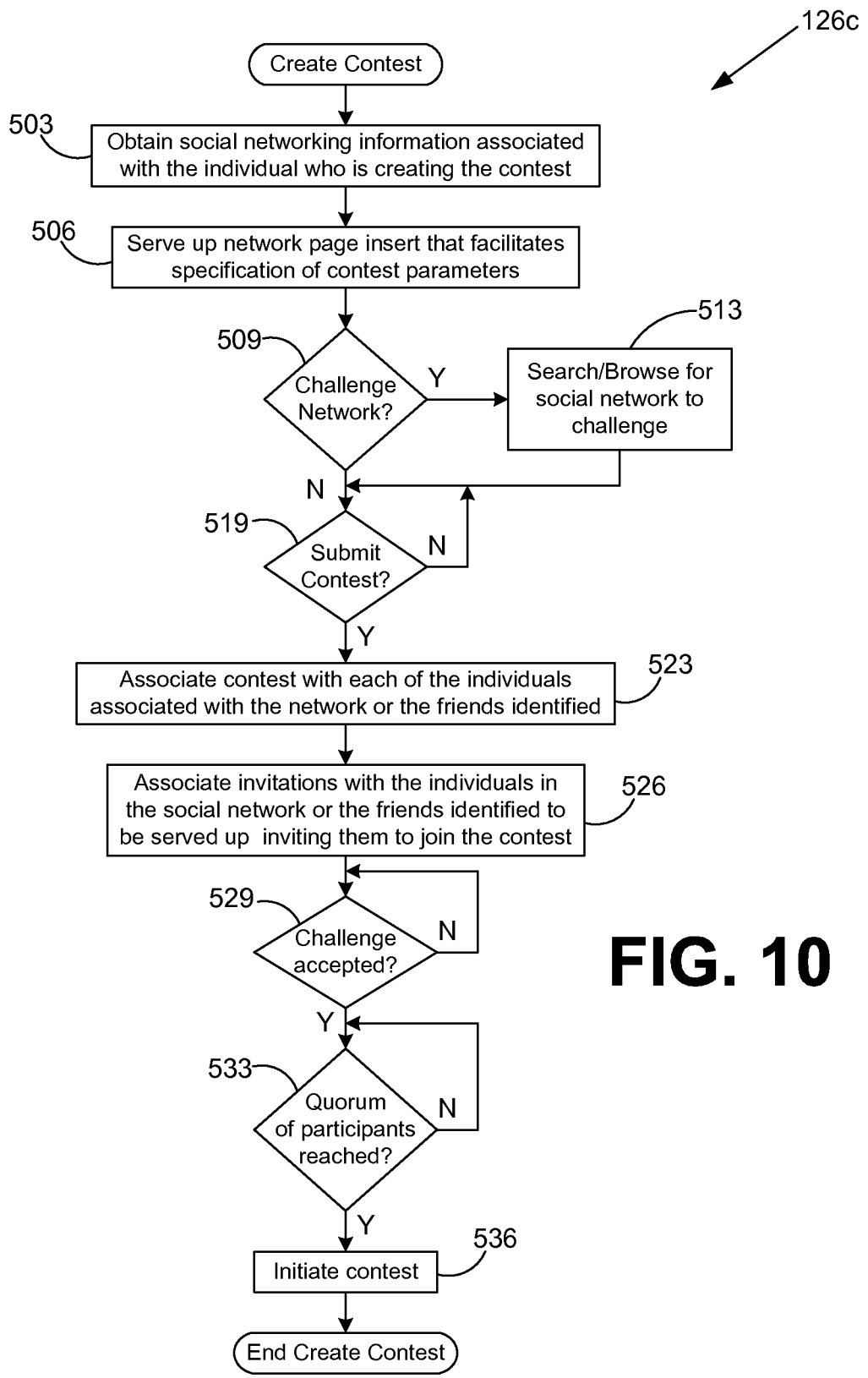

Referring next to FIG. 10, shown is a flow chart that provides one example of the operation of a contest application 126 (FIG. 1), denoted herein as contest application 126c, that is implemented to facilitate the creation of a new contest 179 (FIG. 3) as described above according to an embodiment of the present invention. Alternatively, the flow chart of FIG. 10 may be viewed as depicting steps of an example of a method implemented in the contest server 103 (FIG. 1) to facilitate the creation of a new contest 179.

Beginning with box 503, the contest application 126c obtains the social network information associated with the individual who is creating the contest 179 (FIG. 3). To do this, the contest application 126c communicates with the social networking server 106 (FIG. 1) to request the social networks and friends associated with the individual who is creating the contest 179. This information is used to generate the various network page inserts such as, for example, network page inserts 161b and 161c. Thereafter, in box 506, the contest application 126c serves up the network page insert 161c (FIG. 5) or other network page inserts that are similar in scope that facilitates the specification of the various parameters of the contest 179 to be created. Then, in box 509, the contest application 126c determines whether the user is challenging an existing social network 319 (FIG. 4) for the respective contest 179. If so, then the contest application 126c proceeds to box 513. Otherwise, the contest application 126c progresses directly to box 519.

In box 513, the contest application 126c implements a searching or browsing function to allow the user to identify the respective social network 319 to which the challenge is to be issued for the respective contest 179. Thereafter, the contest application 126c proceeds to box 519.

The social networks or friends that were served up to the client 109 in box 503 allow an individual to create a contest 179 in that they may select the friend with whom the social network of the opposing team will start, or may choose the social network 319 outright to challenge for the respective contest as described above with respect to the network page insert 161c (FIG. 5). Then, in box 519, the contest application 126c determines whether the user has submitted the contest 179 to begin by virtue of manipulating the submit button 383 (FIG. 5).

Assuming this is the case, then the contest application 126c proceeds to box 523 in which the contest 179 is associated with each of the individuals associated with the given network 319 specified by the creator of the game. Alternatively, the contest 179 is associated with the one or more friends to whom the challenge was issued by the user. In this sense, a challenge is issued to either the members of the social network or to the respective friends and is displayed on the respective network page insert 161b (FIG. 4) associated with the respective individuals that receive such challenge. This is done by associating the challenge for the contest 179 with the respective individuals in the contest data 133 of the data store 129 (FIG. 1).

Then, in box 526, the invitations to join or commence the contest are associated with the respective individuals in the given social network, or with the friends identified in the network page insert 161c described above. The invitation may be in form of the challenge in which the "accept challenge" button 326 is indicated with respect to a given contest 179 for a given social network 319 as described above with respect to FIG. 4. Alternatively, the invitation may be issued to a specific friend by way of the contest invitations 303 depicted in the network page insert 101b (FIG. 4).

If, in box 529, the challenge is accepted either by an individual associated with the challenged social network 319 or by a friend who accepted the challenge, then the contest application 126c proceeds to box 533. In box 533, the contest application 126c waits until a minimum quorum of participants is reached for each of the teams associated with the contest 179. Assuming that the quorum is reached for each of the teams 183, then the contest application 126c proceeds to box 536 in which the contest is initiated. In this sense, the contest is initiated by executing one of the contest applications 126a or 126b (FIG. 8 or 9). Thereafter, the contest application 126c ends as shown.

Figure 11:
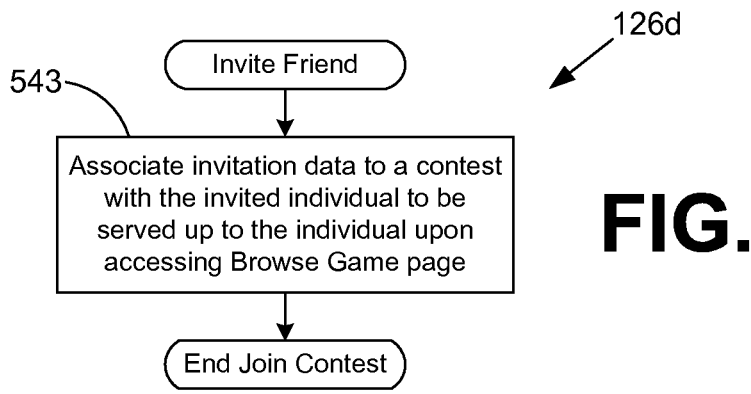

Referring next to FIG. 11, shown is a flow chart that provides one example of the operation of a contest application 126 (FIG. 1), denoted herein as contest application 126d, that is implemented to invite a friend into an existing contest 179 (FIG. 3) as described above according to an embodiment of the present invention. Alternatively, the flow chart of FIG. 11 may be viewed as depicting steps of an example of a method implemented in the contest server 103 (FIG. 1) to invite a friend into an existing contest 179.

The contest application 126d is implemented to invite a friend into an existing contest 179. Thus, assuming that a user has sent an invitation to a given friend by manipulating various user interfaces presented to a user after manipulating the "invite friends" button 236 (FIG. 3), the contest application 126d associates invitation data to the contest 179 with the invited individual. This data is served up to the individual when that individual accesses the network page insert 161b (FIG. 4) and is listed as one of the contest invitations 303. Thereafter, the contest application 126d ends as shown.

Figure 12:
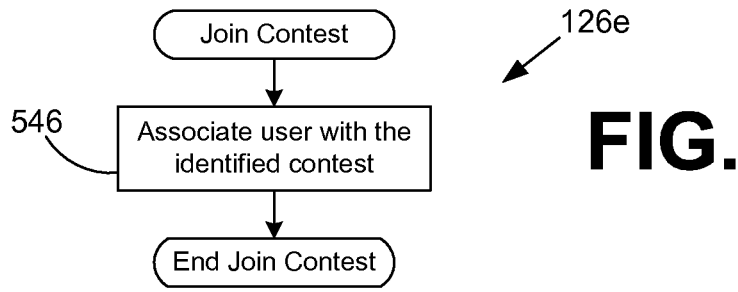

Referring next to FIG. 12, shown is a flow chart that provides one example of the operation of a contest application 126 (FIG. 1), denoted herein as contest application 126e, that is implemented to allow an individual to join a contest 179 (FIG. 3) as described above according to an embodiment of the present invention. Alternatively, the flow chart of FIG. 12 may be viewed as depicting steps of an example of a method implemented in the contest server 103 (FIG. 1) to allow an individual to join a contest 179.

In box 546, the contest application 126e responds to an acceptance of an invitation from a friend to join in a contest 179, or to a manipulation of a "join" button 323 or an "accept challenge" button 326 associated with the respective social network 319 as depicted in the network page insert 161b. Once an invitation/challenge is accepted, or an individual joins a game, the contest application 126e associates the respective user with the identified contest 179. Thereafter, the contest application 126e ends as shown.

Figure 13:
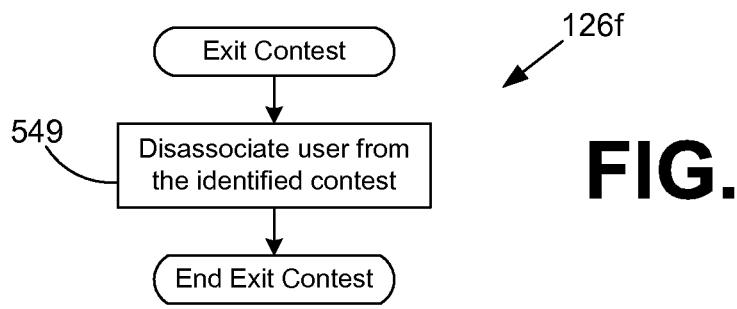

Referring next to FIG. 13, shown is a flow chart that provides one example of the operation of a contest application 126 (FIG. 1), denoted herein as contest application 126f, that is implemented to allow an individual to exit a contest 179 (FIG. 3) as described above according to an embodiment of the present invention. Alternatively, the flow chart of FIG. 13 may be viewed as depicting steps of an example of a method implemented in the contest server 103 (FIG. 1) to allow an individual to exit a contest 179.

As described in FIG. 13, the contest application 126f is initiated when a user has indicated that they wish to exit a game as is determined when a user manipulates the "exit game" button 246 (FIG. 3). When the user manipulates the exit game button 246, a message is transmitted from the client 109 (FIG. 1) to the contest server 103 either directly or by way of the social networking server 106 (FIG. 1) to instruct the contest application 126f to remove the user from the contest 179. In box 549, the contest application 126f disassociates the user from the identified contest 179. Thereafter, the contest application 126f ends as shown.

Figure 14:
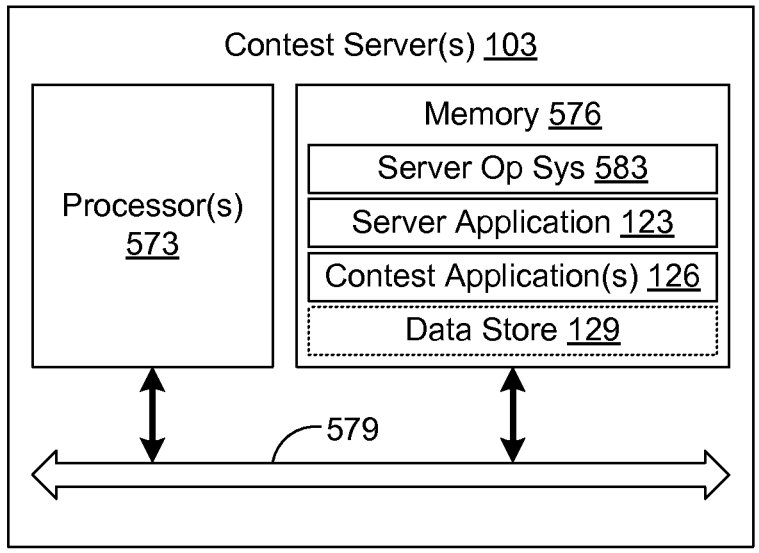
FIG. 14 is a schematic block diagram that illustrates one example of the contest server of FIG. 1 according to an embodiment of the present invention.

With reference to FIG. 14, shown is one example of a contest server 103 that comprises a server computer or equivalent device according to an embodiment of the present invention. The contest server 103 may include one or more processor circuits having a processor 573 and a memory 576, both of which are coupled to a local interface 579. In this respect, the local interface 579 may comprise, for example, a data bus with an accompanying control/address bus as can be appreciated.

Stored on the memory 576 and executable by the processor 573 are various components such as a server operating system 583, the server application 123 such as, for example, a web server, and the contest application(s) 126. Also, the data store 129 may be located in the memory 576 as can be appreciated. In addition, it is understood that many other components may be stored in the memory 576 and executable by the processors 573. Also, such components may reside in a memory that is external from the contest server 103 as can be appreciated.

Figure 15:
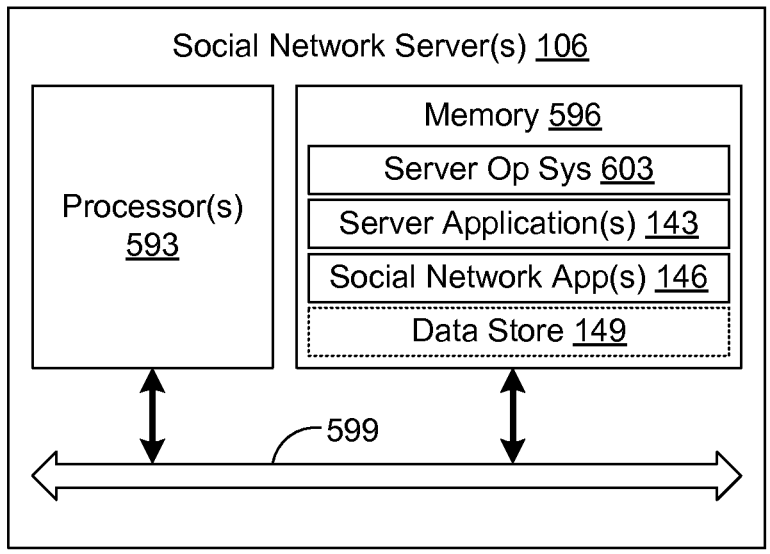
FIG. 15 is a schematic block diagram that illustrates one example of the social networking server of FIG. 1 according to an embodiment of the present invention.

With reference to FIG. 15, shown is one example of a social networking server 106 that comprises a server computer or equivalent device according to an embodiment of the present invention. The social networking server 106 may include one or more processor circuits having a processor 593 and a memory 596, both of which are coupled to a local interface 599. In this respect, the local interface 599 may comprise, for example, a data bus with an accompanying control/address bus as can be appreciated.

Stored on the memory 596 and executable by the processor 593 are various components such as a server operating system 603, the server application 143 such as, for example, a web server, and the social network application(s) 146. Also, the data store 149 may be located in the memory 596 as can be appreciated. In addition, it is understood that many other components may be stored in the memory 596 and executable by the processors 593. Also, such components may reside in a memory that is external from the social networking server 106 as can be appreciated.

Figure 16:
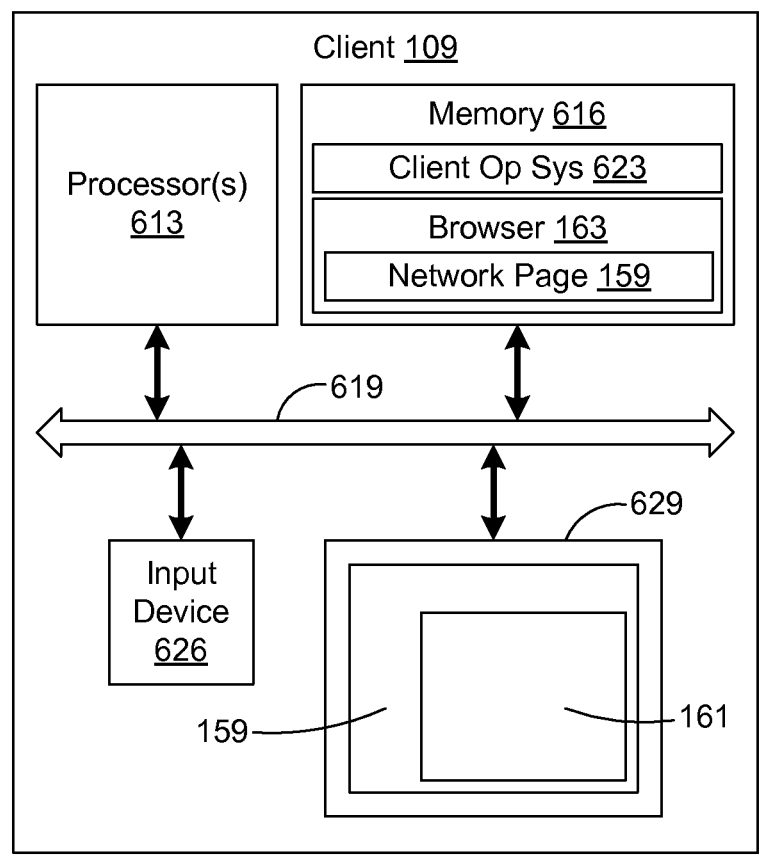
FIG. 16 is a schematic block diagram that illustrates one example of the client of FIG. 1 according to an embodiment of the present invention.

With reference to FIG. 16, shown is one example of a client 109 according to an embodiment of the present invention. As shown, the client 109 also includes a processor circuit having a processor 613 and a memory 616, both of which are coupled to a local interface 619. The local interface 619 may comprise, for example, a data bus with an accompanying control/address bus as can be appreciated. In this respect, the client 109 may comprise a computer system or other system with like capability.

Stored in the memory 616 and executable by the processor 613 are a client operating system 623 and a browser 163. The browser 163 is executed to access and render the network pages 159 that include the network pages inserts 161 as described above. The client 109 also may include one or more input or peripheral devices 626 as described above. Also, the client 109 includes the display device 629 upon which the network page 159 is rendered.

As set forth above, with reference to both FIGS. 14, 15, and 16, a number of components are stored in the memories 576, 596, and 616 and are executable by the respective processors 573, 593, and 613. In this respect, the term "executable" refers to a program file that is in a form that can ultimately be run by the respective processors 573, 593, and 613. Examples of executable programs may be, for example, a compiled program that can be translated into machine code in a format that can be loaded into a random access portion of the memories 576, 596, and 616 and run by the processors 573, 593, and 613, respectively, or source code that may be expressed in proper format such as object code that is capable of being loaded into a of random access portion of the memories 576, 596, and 616 and executed by the processors 573, 593, and 613, respectively. An executable program may be stored in any portion or component of the memories 576, 596, and 616 including, for example, random access memory, read-only memory, a hard drive, compact disk (CD), floppy disk, or other memory components.

Each of the memories 576, 596, and 616 is defined herein as both volatile and nonvolatile memory and data storage components. Volatile components are those that do not retain data values upon loss of power. Nonvolatile components are those that retain data upon a loss of power. Thus, each of the memories 576, 596, and 616 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 573, 593, and 613 may represent multiple processors and each of the memories 576, 596, and 616 may represent multiple memories that operate in parallel processing circuits, respectively. In such a case, each of the local interfaces 579, 599, and 619 may be an appropriate network that facilitates communication between any two of the multiple processors, between any processor and any of the memories, or between any two of the memories, etc. The processors 573, 593, and 613 may be of electrical or of some other construction as can be appreciated by those with ordinary skill in the art.

The server operating systems 583 and 603, and the client operating system 623, are executed to control the allocation and usage of hardware resources such as the memory, processing time and peripheral devices in the servers 103/106 and the client 109. In this manner, the operating systems 583, 603, and 623 serve as the foundation on which applications depend as is generally known by those with ordinary skill in the art.

Although the functionality of the contest applications 126, server applications 123/143, and the social network applications 146 (collectively referred to hereafter as "the applications") is described as being embodied in software or code executed by general purpose hardware as discussed above, as an alternative the same may also be embodied in dedicated hardware or a combination of software/general purpose hardware and dedicated hardware. If embodied in dedicated hardware, the functionality of the applications can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 8-13 show the implementation of various contest applications 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 8-13 show a specific order of execution, it is understood that the order of execution may differ from that which is depicted. For example, the order of execution of two or more blocks may be scrambled relative to the order shown. Also, two or more blocks shown in succession in FIGS. 8-13 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where any of the applications are expressed in the form of software or code, they can be embodied in any computer-readable medium for use by or in connection with an instruction execution system such as, for example, a processor in a computer system or other system. In this sense, the applications may comprise, for example, statements including instructions and declarations that can be fetched from the computer-readable medium and executed by the instruction execution system. In the context of the present invention, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system, comprising:
    a server accessible by a plurality of clients;
    an application executed on the server that is configured to at least stage a contest between a plurality of teams, wherein the contest requires each of the plurality of teams to achieve a predefined goal to win the contest;
    the application further configured to restrict a membership of each team of the plurality of teams to a plurality of individuals associated with a respective social network of a plurality of social networks, wherein the plurality of social networks are obtained from a source external to the contest, and the contest is configured to be inserted into a social networking site;
    the application further configured to enable an individual of the plurality of individuals associated with a first social network to create the contest by specifying the first social network and a second social network of the plurality of social networks to be associated with the contest;
    the application further configured to present an invitation to join the contest to the plurality of individuals included in the second social network;
    the application further configured to offer at least one virtual tool for sale to respective individuals of the plurality of individuals to employ during the contest to aid in achieving the predefined goal, the application further configured to maintain an inventory of virtual tools for each of the plurality of individuals; and
    the application being configured to issue a virtual currency to the plurality of individuals who join a team of the plurality of teams.

2. The system of claim 1, wherein an entry fee for the contest comprises a predefined amount of the virtual currency.

3. The system of claim 1, wherein the at least one virtual tool is durable instead of consumable so as to be available for an entirety of the contest.

4. The system of claim 1, wherein the at least one virtual tool is consumable instead of durable such that the at least one virtual tool is available for a single use during the contest.

5. A method, comprising:
    staging a contest using a server accessible by a plurality of clients between a plurality of teams, wherein the contest requires each team of the plurality of teams to achieve a predefined goal; and
    restricting a membership of each team of the plurality of teams to a plurality of individuals associated with a respective social network of a plurality of social networks accessible by the server.

6. The method of claim 5, wherein the plurality of social networks are obtained from a source external to the contest.

7. The method of claim 5, further comprising providing spectator access to the contest to the plurality of individuals associated with the respective social network to which the membership of a team of the plurality of teams is restricted.

8. The method of claim 5, further comprising of facilitating a creation of the contest by an individual of the plurality of individuals associated with the respective network.

9. The method of claim 8, wherein the individual specifies an entry fee to be charged to the plurality of individuals who join the membership of any team of the plurality of teams involved in the contest.

10. The method of claim 8, wherein the contest is created by the individual by specifying a first social network and a second social network of the plurality of social networks to be associated with the contest, wherein the individual is included in the first social network.

11. The method of claim 10, further comprising presenting an invitation to join the contest to the plurality of individuals included in the second social network.

12. The method of claim 5, further comprising offering at least one virtual tool for sale to respective individuals of the plurality of individuals to employ during the contest to aid in achieving the predefined goal.

13. The method of claim 5, further comprising maintaining an inventory of virtual tools for each of the plurality of individuals, wherein the inventory of virtual tools may be employed during the contest to aid in achieving the predefined goal.

14. The method of claim 5, further comprising offering at least one virtual accent for sale to respective individuals of the plurality of individuals, each of the at least one virtual accent being applied to an avatar associated with a respective individual of the plurality of individuals.

15. The method of claim 5, further comprising facilitating a use of an offensive virtual tool by an individual on a first team of the plurality of teams to inhibit a progress of a second team of the plurality of teams in achieving the predefined goal.

16. The method of claim 15, further comprising facilitating a use of a defensive virtual tool by another individual on the second team to counter the use of the offensive virtual tool by the individual on the first team.

17. The method of claim 5, further comprising inserting the contest into a social networking site.

18. The method of claim 5, further comprising interfacing with a social networking site to access the plurality of social networks.

19. The method of claim 5, further comprising hosting a message board accessible to the plurality of individuals participating as a member of any team of the plurality of teams engaged in the contest.

20. The method of claim 5, further comprising hosting a message board accessible only to the plurality of individuals participating as a member of a respective team of the plurality of teams engaged in the contest.

21. The method of claim 5, further comprising facilitating presentation of an invitation from an individual of the plurality of individuals participating as a member of a team of the plurality of teams to a third party, the third party being included in the respective social network to which the membership of the team is restricted.

22. The method of claim 5, further comprising issuing a virtual currency to the plurality of individuals.

23. The method of claim 5, further comprising charging an entry fee to each of the plurality of individuals who joins the membership of a team of the plurality of teams involved in the contest.

24. The method of claim 23, wherein the entry fee comprises a predefined amount of virtual currency.

25. The method of claim 23, further comprising distributing the entry fee paid by each of the plurality of individuals to the membership of a team of the plurality of teams that wins the contest.

26. A system, comprising:
a server accessible by a plurality of clients;
an application executed on the server configured to at least stage a contest between a plurality of teams, wherein the contest requires each of the plurality of teams to achieve a predefined goal to win the contest; and
the application restricting a membership of each team of the plurality of teams to a plurality of individuals associated with a respective social network of a plurality of social networks.

27. The system of claim 26, wherein the application is further configured to obtain the plurality of social networks from a source external to the contest.

28. The system of claim 26, wherein the application is further configured to insert the contest into a social networking site.

29. The system of claim 26, wherein the application is further configured to interface with a social networking site to access the plurality of social networks.

30. The system of claim 26, wherein the application is further configured to provide a spectator access to the contest to the plurality of individuals associated with the respective social network to which the membership of a team of the plurality of teams is restricted.

31. The system of claim 26, wherein the application is further configured to enable an individual of the plurality of individuals associated with the respective social network to create the contest.

32. The system of claim 31, wherein the application is further configured to enable the individual to specify an entry fee to be charged to the plurality of individuals who join the membership of any team of plurality of teams involved in the contest.

33. The system of claim 31, wherein the application is further configured to receive a specification from the individual of a first social network and a second social network of the plurality of social networks to be associated with the contest, and the individual is included in the first social network.

34. The system of claim 33, wherein the application is further configured to present an invitation to join the contest to the plurality of individuals included in the second social network.

35. The system of claim 26, wherein the application is further configured to offer at least one virtual tool for sale to respective individuals of the plurality of individuals to employ during the contest to aid in achieving the predefined goal.

36. The system of claim 35, wherein the application is further configured to add a fee paid to purchase the at least one virtual tool to an amount of virtual currency awarded to the plurality of individuals who are members of a team of the plurality of teams that wins the contest.

37. The system of claim 26, wherein the application is configured to maintain an inventory of virtual tools for each of the plurality of individuals, and the inventory of virtual tools may be employed during the contest to aid in achieving the predefined goal.

38. The system of claim 26, wherein the application is further configured to offer at least one virtual accent for sale to respective individuals of the plurality of individuals, each of the at least one virtual accent being applied to an avatar associated with a respective individual of the plurality of individuals.

39. The system of claim 26, wherein the application is further configured to provide at least one virtual tool to the plurality of individuals involved in the contest, the at least one virtual to being employed by the plurality of individuals to aid a team of the plurality of teams in achieving the predefined goal.

40. The system of claim 39, wherein the at least one virtual tool is durable so as to be available for an entirety of the contest.

41. The system of claim 39, wherein the at least one virtual tool is durable so as to be available for a plurality of contests.

42. The system of claim 39, wherein the at least one virtual tool is consumable such that the at least one virtual tool is available for a single use during the contest.

43. The system of claim 26, wherein the application is further configured to facilitate a use of an offensive virtual tool by an individual on a first team of the plurality of teams to inhibit a progress of a second team of the plurality of teams in achieving the predefined goal.

44. The system of claim 43, wherein the application is further configured to facilitate a use of a defensive virtual tool by another individual on the second team to counter the use of the offensive virtual tool by the individual on the first team.

45. The system of claim 26, wherein the application is further configured to host a message board accessible to the plurality of individuals participating as a member of any team of the plurality of teams engaged in the contest.

46. The system of claim 26, wherein the application is further configured to host a message board accessible only to the plurality of individuals participating as a member of a respective team of the plurality of teams engaged in the contest.

47. The system of claim 26, wherein the application is further configured to facilitate presenting of an invitation from an individual of the plurality of individuals participating as a member of a team of the plurality of teams to a third party, the third party being included in the respective social network to which membership of the team is restricted.

48. The system of claim 26, wherein the application is further configured to issue a virtual currency to the plurality of individuals.

49. The system of claim 26, wherein the application is further configured to charge an entry fee to each of the plurality of individuals who joins the membership of a team of the plurality of teams involved in the contest.

50. The system of claim 49, wherein the entry fee comprises a predefined amount of virtual currency.

51. The system of claim 49, wherein the application is further configured to distribute the entry fee paid by each of the plurality of individuals to the membership of the team that wins the contest.

52. A system, comprising:
at least one server accessible by a plurality of clients;
means in the server for staging a contest between a plurality of teams, wherein the contest requires each of the plurality of teams to achieve a predefined goal to win the contest; and
wherein a membership to each team of the plurality of teams is restricted to a plurality of individuals associated with a respective social network of a plurality of social networks.

53. The system of claim 52, wherein the plurality of social networks are obtained from a source external to the contest.

54. The system of claim 52, wherein the contest is configured to be inserted into a social networking site.

55. The system of claim 52, further comprising means in the server for interfacing with a social networking site to access the plurality of social networks.

56. The system of claim 52, further comprising means in the server for enabling an individual of the plurality of individuals to create the contest by specifying a first social network and a second social network of the plurality of social networks to be associated with the contest, wherein the individual is included in the first social network.

57. The system of claim 52, further comprising means in the server for offering at least one virtual tool for sale to respective individuals of the plurality of individuals to employ during the contest to aid in achieving the predefined goal.

58. The system of claim 57, further comprising means for adding a fee paid to purchase the at least one virtual tool to an amount of virtual currency awarded to the plurality of individuals who are members of a team of the plurality of teams that wins the contest.

59. The system of claim 52, further comprising means in the server for offering at least one virtual accent for sale to respective individuals of the plurality of individuals, each of the at least one virtual accent being applied to an avatar associated with a respective individual of the plurality of individuals.

60. The system of claim 52, further comprising means in the server for providing at least one virtual tool to the plurality of individuals involved in the contest, the at least one virtual tool being employed by the plurality of individuals to aid a team of the plurality of teams in achieving the predefined goal.

61. The system of claim 60, wherein the at least one virtual tool is durable so as to be available for an entirety of the contest.

62. The system of claim 60, wherein the at least one virtual tool is durable so as to be available for a plurality of contests.

63. The system of claim 60, wherein the at least one virtual tool is consumable such that the at least one virtual tool is available for a single use during the contest.

64. The system of claim 60, wherein the at least one virtual tool is an offensive tool configured to inhibit a progress of an opposing team of the plurality of teams in achieving the predefined goal.

65. The system of claim 60, wherein the at least one virtual tool is a defensive tool configured to counter a use of an offensive tool by an individual of the plurality of individuals on an opposing team of the plurality of teams.

66. The system of claim 52, further comprising means in the server for issuing a virtual currency to the plurality of individuals.

67. A non-transitory computer-readable medium embodying a program executable by a processor-based system, comprising:
an application configured to at least stage a contest between a plurality of teams, wherein the contest requires each of the plurality of teams to achieve a predefined goal to win the contest; and
the application further configured to restrict a membership of each team of the plurality of teams to a plurality of individuals associated with a respective social network of a plurality of social networks.

68. The non-transitory computer-readable medium of claim 67, wherein the plurality of social networks are obtained from a source external to the contest.

69. The non-transitory computer-readable medium of claim 67, wherein the application is further configured to enable an individual of the plurality of individuals associated with a respective social network of the plurality of social networks to create the contest.

70. The non-transitory computer-readable medium of claim 69, wherein the application is further configured to receive a specification by the individual of a first social network and a second social network of the plurality of social networks to be associated with the contest, and the individual is included in the first social network.

71. The non-transitory computer-readable medium of claim 67, wherein the application is further configured to offer at least one virtual tool for sale to respective individuals of the plurality of individuals to employ during the contest to aid in achieving the predefined goal.

72. The non-transitory computer-readable medium of claim 71, wherein the application is further configured to add a fee paid to purchase the at least one virtual tool to an amount of virtual currency awarded to the plurality of individuals that are members of a team of the plurality of teams that wins the contest.

73. The non-transitory computer-readable medium of claim 67, wherein the application is further configured to offer at least one virtual accent for sale to respective individuals of the plurality of individuals, each of the at least one virtual accent being applied to an avatar associated with a respective individual of the plurality of individuals.

74. The non-transitory computer-readable medium of claim 67, wherein the application is further configured to provide at least one virtual tool to the plurality of individuals involved in the contest, the at least one virtual tool being employed by the plurality of individuals to aid a team of the plurality of teams in achieving the predefined goal.

75. The non-transitory computer-readable medium of claim 74, wherein the at least one virtual tool is durable so as to be available for an entirety of the contest.

76. The non-transitory computer-readable medium of claim 74, wherein the at least one virtual tool is durable so as to be available for a plurality of contests.

77. The non-transitory computer-readable medium of claim 74, wherein the at least one virtual tool is consumable such that the at least one virtual tool is available for a single use during the contest.

78. The non-transitory computer-readable medium of claim 67, wherein the application is further configured to facilitate a use of an offensive virtual tool by an individual on a first team of the plurality of teams to inhibit a progress of a second team of the plurality of teams in achieving the predefined goal.

79. The non-transitory computer-readable medium of claim 78, wherein the application is further configured to facilitate a use of a defensive virtual tool by another individual of the plurality of individuals on the second team to counter the use of the offensive virtual tool by the individual on the first team.

* * * * *

UNITED STATES PATENT AND TRADEMARK OFFICE
CERTIFICATE OF CORRECTION

| | | |
|---|---|---|
| PATENT NO. | : 9,076,303 B1 | Page 1 of 1 |
| APPLICATION NO. | : 11/835844 | |
| DATED | : July 7, 2015 | |
| INVENTOR(S) | : Joseph C. Park et al. | |

It is certified that error appears in the above-identified patent and that said Letters Patent is hereby corrected as shown below:

In The Claims
Claim 32, line 36: After "any team of" insert --the--.

Signed and Sealed this
Sixteenth Day of February, 2016

Michelle K. Lee
*Director of the United States Patent and Trademark Office*